US008600306B2

(12) United States Patent
Yamamoto

(10) Patent No.: US 8,600,306 B2
(45) Date of Patent: Dec. 3, 2013

(54) WIRELESS COMMUNICATION CONTROL DEVICE

(75) Inventor: Yoshihito Yamamoto, Fukuoka (JP)

(73) Assignee: Panasonic Corporation, Osaka (JP)

( * ) Notice: Subject to any disclaimer, the term of this patent is extended or adjusted under 35 U.S.C. 154(b) by 829 days.

(21) Appl. No.: 12/777,971

(22) Filed: May 11, 2010

(65) Prior Publication Data

US 2010/0222009 A1 Sep. 2, 2010

Related U.S. Application Data

(63) Continuation of application No. PCT/JP2008/003262, filed on Nov. 11, 2008.

(30) Foreign Application Priority Data

Nov. 12, 2007 (JP) ................................. 2007-292839

(51) Int. Cl.
*H04B 1/00* (2006.01)
*H04B 15/00* (2006.01)

(52) U.S. Cl.
USPC .......................................... 455/63.4; 455/63.1

(58) Field of Classification Search
USPC ....................... 455/63.4, 63.1, 562.1; 375/267
See application file for complete search history.

(56) References Cited

U.S. PATENT DOCUMENTS

| | | | | |
|---|---|---|---|---|
| 5,781,845 | A * | 7/1998 | Dybdal et al. | 455/65 |
| 7,477,921 | B2 * | 1/2009 | Shattil | 455/562.1 |
| 7,738,925 | B2 * | 6/2010 | Nguyen et al. | 455/562.1 |
| 2004/0266354 | A1 * | 12/2004 | Hamada et al. | 455/63.4 |
| 2009/0046006 | A1 | 2/2009 | Inagaki | |

FOREIGN PATENT DOCUMENTS

| | | |
|---|---|---|
| EP | 1 077 536 | 2/2001 |
| JP | 07-118607 | 12/1995 |
| JP | 2001-060905 | 3/2001 |
| JP | 2004-048754 | 2/2004 |
| JP | 2006-211154 | 8/2006 |
| WO | 2006/103888 | 10/2006 |

OTHER PUBLICATIONS

Trasnslation of JP 2004-048754A, 13 pages, Claim+Detailed Description.*
International Search Report dated Nov. 28, 2008.

* cited by examiner

*Primary Examiner* — Lewis West
(74) *Attorney, Agent, or Firm* — Dickinson Wright PLLC

(57) ABSTRACT

A wireless communication control device which can stably communicate with another device without interruption by continuously and optimally adjusting a transmission reception direction of a wireless transmission reception unit so as to track the another device even when mobile terminals move while changing relative position between them. A device body (11) of the wireless communication control device comprises a wireless transmission reception unit (13) which transmits and receives a wireless signal, a device displacement amount detection unit (14) which detects a displacement amount of the device body (11), an another device displacement amount extraction unit (15) which extracts the displacement amount of the another device (12) that is a transmission source from the wireless signal received by the wireless transmission reception unit (13), a direction calculation unit (16) which calculates the transmission reception direction of the wireless signal according to the displacement amount of the device body (11) and the displacement amount of the another device (12), and a direction control unit (17) which controls the transmission reception direction of the wireless transmission reception unit (13) according to the calculated direction. Accordingly, the transmission reception direction of the device body (11) can be adjusted so as to track the another device (12).

19 Claims, 7 Drawing Sheets

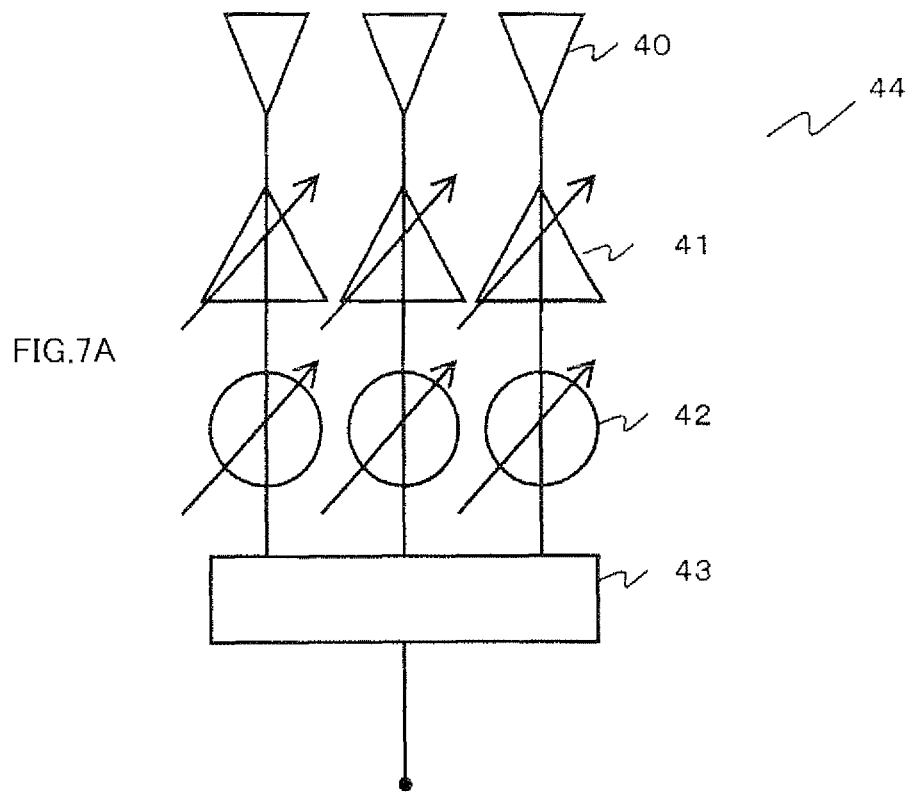
FIG.7A
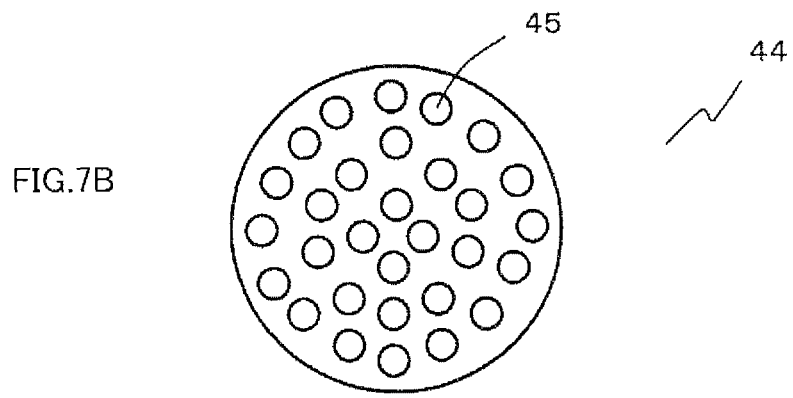
FIG.7B
FIG.7

WIRELESS COMMUNICATION CONTROL DEVICE

CROSS REFERENCE TO RELATED APPLICATIONS

This application is a continuation of International Patent Application No. PCT/JP2008/003262, filed on Nov. 11, 2008, the disclosure of which is incorporated herein by reference in its entirety. International Patent Application No. PCT/JP2008/003262 is entitled to the benefit of Japanese Patent Application No. 2007-292839, filed on Nov. 12, 2007, the disclosure of which is incorporated herein by reference in its entirety.

TECHNICAL FIELD

The present invention relates to a radio communication control apparatus used in portable information terminals or the like that move relative to each other.

BACKGROUND ART

The use of higher communication frequencies in recent years has brought ongoing commercialization of highly directional communication between mobile devices such as portable information terminals. A problem with such communication is interruption of communication due to slight changes in the positions or angles of the mobile devices.

Meanwhile, the miniaturization of gyro sensors has led to gyro sensors beginning to be installed in mobile devices. Correcting the direction of directivity based on a displacement amount of a mobile device acquired by a gyro sensor installed in that mobile device enables more stable and optimal communication to be implemented than with conventional mobile devices.

An antenna control apparatus disclosed in Patent Document 1 is known as such a technology, for example. The antenna control apparatus disclosed in Patent Document performs high-precision satellite supplementation by means of an antenna installed in a vehicle. Specifically, this apparatus uses a means of detecting GPS information and yaw angle (azimuth angle) information and an inclinometer that detects the angle of inclination of the vehicle to perform high-precision drive control of the azimuth angle and elevation angle directions of the antenna.

An antenna control apparatus disclosed in Patent Document 2 is also known, for example. The antenna control apparatus disclosed in Patent Document 2 has a gyro, a movement amount sensor, and a radio field intensity detection and evaluation section. The gyro detects the orientation of the apparatus. The movement amount sensor detects an amount of movement of the apparatus. The radio field intensity detection and evaluation section determines whether or not a radio wave received from another apparatus that is a communicating party is greater than or equal to a predetermined threshold value. The antenna control apparatus of Patent Document 2 performs a direction scan in order to identify the direction in which the other apparatus is located. Then, if the radio field intensity detection and evaluation section outputs an indication that a radio wave from the other apparatus is greater than or equal to the threshold value after performing a direction scan twice, this apparatus decides the orientation of the directional antenna based only on the output of the gyro and the movement amount sensor—that is, without performing a direction scan.

Patent Document 1: Japanese Patent Application Publication No. HEI 7-118607
Patent Document 2: Japanese Patent Application Laid-Open No. 2006-211154

DISCLOSURE OF INVENTION

Problems to be Solved by the Invention

However, a problem with the antenna control apparatus disclosed in Patent Document 1 is that it can only be applied to a case in which the position of one device is stationary, as in the case of a vehicle and a satellite, and is difficult to apply to communication between devices of which neither is stationary, such as mobile devices.

There is a similar problem with the antenna control apparatus disclosed in Patent Document 2 in that it presupposes that one device is stationary, and is difficult to apply to communication between devices of which neither is stationary, such as mobile devices. In the case of devices of which neither is stationary, both the local device and the other device move, making a situation prone to arise in which communication cannot be performed immediately through correction on the local device side alone. It is therefore necessary to perform a direction scan in order to re-identify the other device, and decide the orientation of the directional antenna, every time a situation arises in which communication cannot be performed.

Thus, with conventional control apparatuses, it is difficult to detect the position and direction of a counterpart device if the position and direction of that device become outside the range of antenna directivity, and a situation arises in which communication cannot be performed immediately by corrective device control, and communication is interrupted. That is to say, with conventional control apparatuses, even if they are effective when one is a stationary station, there is a major problem from the standpoint of practical application when both the local device and the counterpart device are portable information terminals that move relative to each other, as in the case of mobile devices.

It is therefore an object of the present invention to solve the above-described problem with conventional antenna control apparatuses, and to provide a radio communication control apparatus that enables stable communication to be performed with a counterpart device without interruption even if the position and direction of the counterpart device become outside the range of antenna directivity.

Means for Solving the Problem

A radio communication control apparatus of the present invention has a configuration comprising: a radio transmitting/receiving section that transmits and receives radio signals; a local apparatus displacement amount detection section that detects a displacement amount of the apparatus body; an other apparatus displacement amount extraction section that extracts from a radio signal received by the radio transmitting/receiving section a displacement amount of another apparatus that is the transmission source of that radio signal; a direction calculation section that calculates a direction in which a radio signal is transmitted/received based on a displacement amount of the apparatus body and a displacement amount of the other apparatus; and a direction control section that controls the transmission/reception direction of the radio transmitting/receiving section based on the calculated direction.

By this means, the transmission/reception direction of the radio transmitting/receiving section of the local device is controlled based on displacement amounts of the apparatus body and the other apparatus, enabling optimal antenna orientation to be maintained at all times, and stable communication to be performed by tracking the counterpart apparatus without interruption.

Advantageous Effects of Invention

In a radio communication control apparatus of the present invention, a direction calculation section calculates a direction of transmission and reception by a radio transmitting/receiving section based on a displacement amount of the apparatus body and a displacement amount of another apparatus acquired by a local apparatus displacement amount detection section and an other apparatus displacement amount extraction section respectively, and a direction control section controls the transmission/reception direction of the radio transmitting/receiving section based on that calculated direction. By this means, a radio communication control apparatus of the present invention can optimally maintain the orientation of the radio transmitting/receiving section in the direction of the other apparatus at all times, and perform stable communication with the other apparatus without interruption, even when both apparatuses are portable information terminals or the like that move relative to each other, and even if the position and direction of the other apparatus become outside the range of directivity of the radio transmitting/receiving section of the apparatus body.

BRIEF DESCRIPTION OF DRAWINGS

FIG. 7 is a configuration diagram showing a radio transmitting/receiving section according to Embodiment 2 of a radio communication control apparatus of the present invention.

BEST MODE FOR CARRYING OUT THE INVENTION

Now, embodiments of a radio communication control apparatus of the present invention will be described with reference to the accompanying drawings.

Embodiment 1

Figure 1:
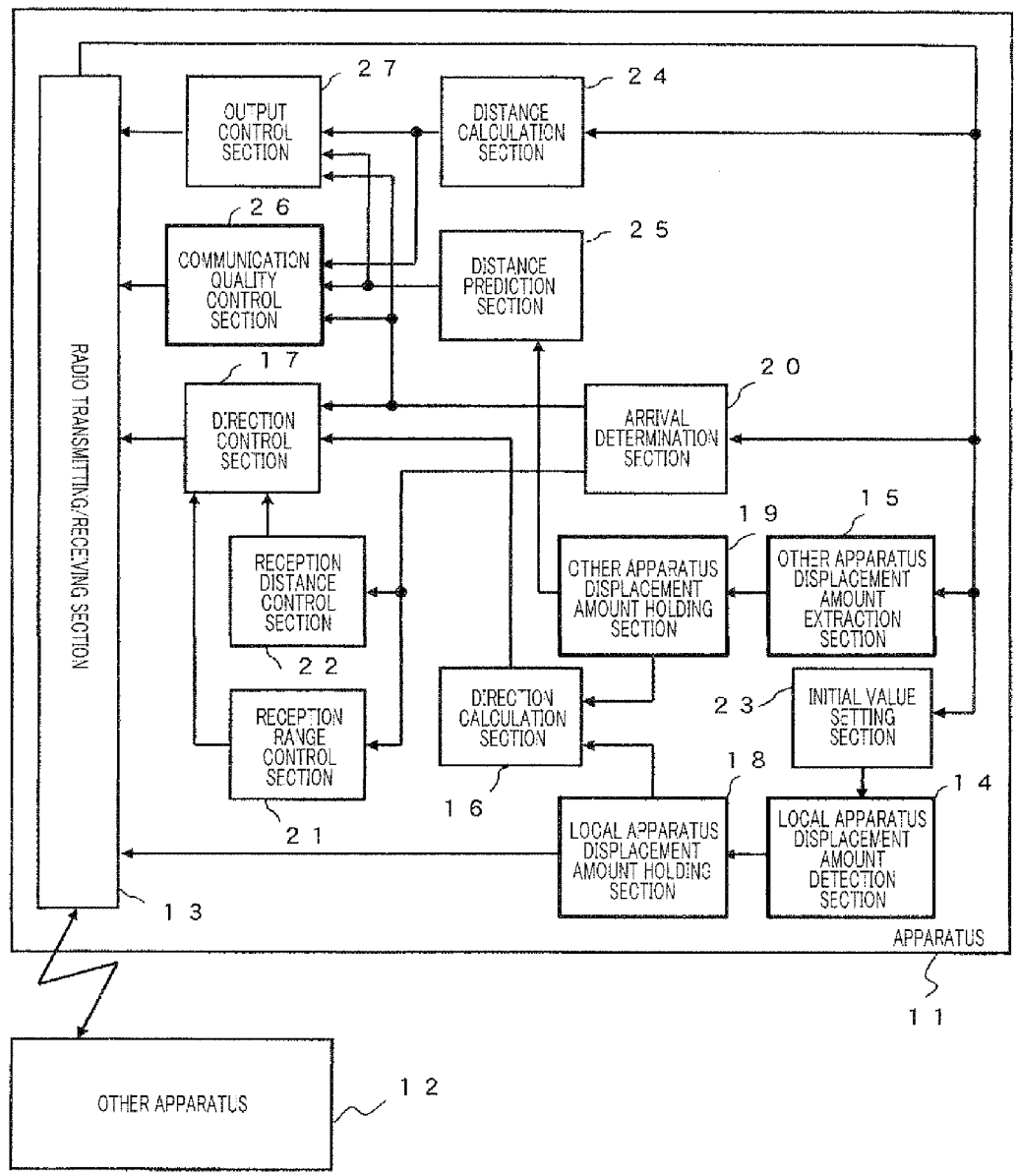
FIG. 1 is a block diagram showing a configuration according to Embodiment 1 of a radio communication control apparatus of the present invention.

FIG. 1 is a block diagram showing a configuration according to Embodiment 1 of a radio communication control apparatus of the present invention.

In FIG. 1, a radio communication control apparatus of this embodiment is an apparatus such as a portable information terminal, for example. That is to say, local apparatus (hereinafter also referred to simply as "apparatus") 11 serving as the apparatus body performs radio communication with other apparatus 12. Apparatus 11 is equipped with radio transmitting/receiving section 13, local apparatus displacement amount detection section 14, other apparatus displacement amount extraction section 15, direction calculation section 16, and direction control section 17. Radio transmitting/receiving section 13 transmits and receives radio signals to/from other apparatus 12. Local apparatus displacement amount detection section 14 is, for example, a recent miniaturized gyro sensor, and detects a displacement amount of movement of apparatus 11. Other apparatus displacement amount extraction section 15 extracts a displacement amount of other apparatus 12 based on a radio signal from other apparatus 12 received by radio transmitting/receiving section 13. Direction calculation section 16 calculates a radio transmitting/receiving section 13 transmission/reception direction with respect to other apparatus 12 based on a displacement amount of apparatus 11 acquired by local apparatus displacement amount detection section 14 and a displacement amount of other apparatus 12 acquired by other apparatus displacement amount extraction section 15. Direction control section 17 performs change control of the transmitting/receiving section 13 transmission/reception direction with respect to other apparatus 12 based on the direction calculated by direction calculation section 16.

Local apparatus displacement amount detection section 14 comprises a gyro, MPU, and memory, for example. Local apparatus displacement amount detection section 14 also has local apparatus displacement amount holding section 18 that holds a detected displacement amount.

Other apparatus displacement amount extraction section 15 detects a displacement amount of other apparatus 12 by extracting displacement amount data stored in a predetermined part, such as a preamble part, of a radio signal from other apparatus 12 received by radio transmitting/receiving section 13. Other apparatus displacement amount extraction section 15 has other apparatus displacement amount holding section 19 that holds a detection result.

Apparatus 11 also has arrival determination section 20, reception range control section 21, and reception distance control section 22. Arrival determination section 20 determines whether or not other apparatus 12 has received a radio signal transmitted by apparatus 11, based on a radio signal received by apparatus from other apparatus 12. Reception range control section 21 controls a range in which a radio signal from other apparatus 12 is received at the time of connection according to an arrival determination section 20 determination result. Reception distance control section 22 controls the reception distance.

Apparatus 11 also has initial value setting section 23 and distance calculation section 24. Initial value setting section 23 performs a search vis-à-vis other apparatus 12, captures a mutual synchronization signal at the time of connection, and sets initial values of mutual positions and directions. Distance calculation section 24 calculates the distance between the apparatuses based on transmitted and received radio signals.

Apparatus 11 also has distance prediction section 25. Distance prediction section 25 predicts a future distance of apparatus 11 from other apparatus 12 from a displacement amount of other apparatus 12 extracted by other apparatus displacement amount extraction section 15.

Apparatus 11 also has communication quality control section 26 and output control section 27. Communication quality control section 26 controls the communication quality of a radio signal transmitted from radio transmitting/receiving section 13 based on a distance calculation section 24 calculation result and a distance prediction section 25 prediction result. Output control section 27 controls output of a radio signal transmitted from radio transmitting/receiving section 13.

Other apparatus 12 is also equipped with the same above-described configuration as apparatus 11.

The operation of the radio communication control apparatus of this embodiment shown in FIG. 1 will now be described.

Figure 2:
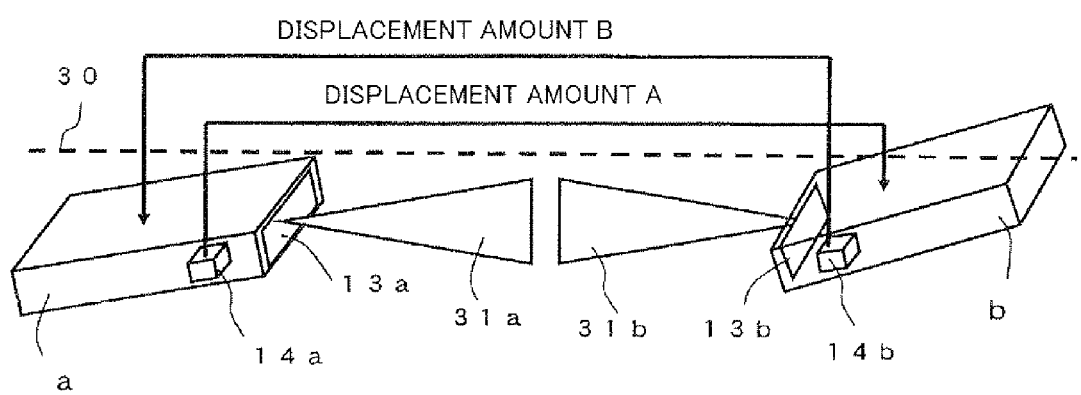
FIG. 2 is a conceptual diagram showing the operation of Embodiment 1.

FIG. 2 is a conceptual diagram showing the operation of this embodiment.

In FIG. 2, apparatus a has local apparatus displacement amount detection section 14a and radio transmitting/receiving section 13a, and apparatus b has local apparatus displacement amount detection section 14b and radio transmitting/receiving section 13b. When apparatus a and apparatus b communicate, apparatus a and apparatus b respectively set a position and direction when they initially achieved mutual communication as reference position 30.

Assume that apparatus a or apparatus b is then displaced with respect to reference position 30 due to movement of the apparatus, jiggling of the user's hand, or the like. In this case, local apparatus displacement amount detection section 14a of apparatus a detects displacement amount A of apparatus a with respect to reference position 30, and transmits this to apparatus b. Similarly, local apparatus displacement amount detection section 14b of apparatus b detects displacement amount B of apparatus b with respect to reference position 30, and transmits this to apparatus a.

Apparatus a controls radio transmitting/receiving section 13a so as to perform opposed emission of radio signal 31a toward apparatus b, based on displacement amount A of apparatus a detected by local apparatus displacement amount detection section 14a and displacement amount B of apparatus b transmitted from apparatus b.

In a similar way, apparatus b controls radio transmitting/receiving section 13b so as to perform opposed emission of radio signal 31b toward apparatus a, based on displacement amount B of apparatus b detected by local apparatus displacement amount detection section 14b and displacement amount A of apparatus a transmitted from apparatus a.

Thus, in this embodiment, apparatus a and apparatus b mutually exchange counterpart apparatus displacement amounts B and A, and change the emission directions of radio signals 31a and 31b of radio transmitting/receiving sections 13a and 13b respectively based on displacement amount A and displacement amount B of apparatuses a and b. By this means, apparatus a and apparatus b can transmit and receive radio signals while constantly tracking the counterpart apparatus.

In this regard, when a method of a conventional apparatus is applied, apparatus a and apparatus b respectively adjust the directions of emissions from radio transmitting/receiving sections 13a and 13b with respect to reference position 30 without receiving displacement amount B or displacement amount A of the counterpart apparatus. Therefore, heretofore, when the limit of the emission direction was reached, mutual tracking was not possible beyond that point, and interruption of communication occurred.

This problem becomes more pronounced as higher communication frequencies are achieved, as in the case of microwave communication.

Figure 3:
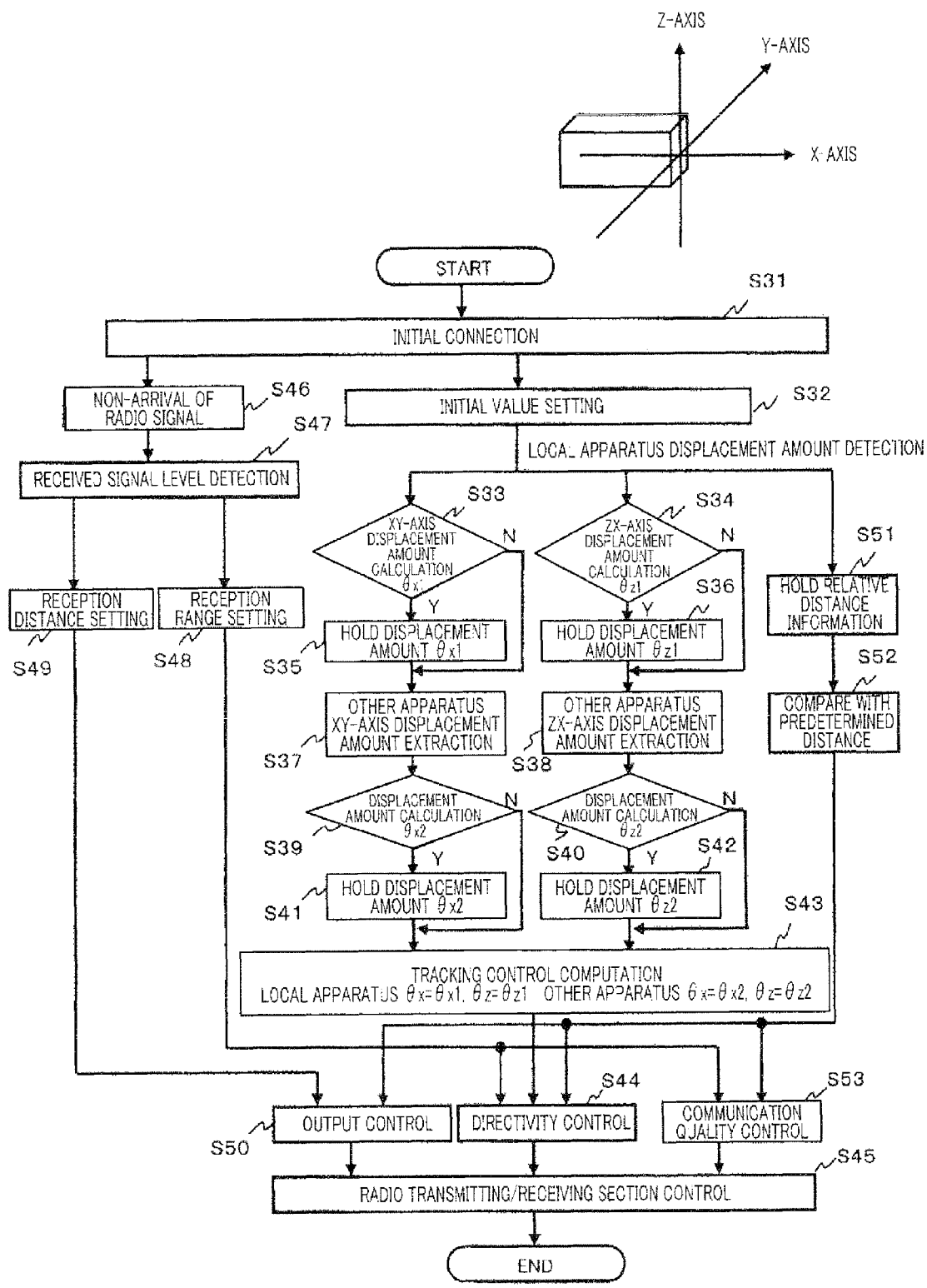
FIG. 3 is a first flowchart showing the operation of Embodiment 1.

FIG. 3 is a first flowchart showing the operation of this embodiment. The operation when the position does not change and only the direction changes for both apparatus 11 and other apparatus 12 is described here with reference to FIG. 1.

In FIG. 3, after initial mutual connection between apparatus 11 and other apparatus 12 is first completed (S31), and a state in which data transmission/reception is possible is established, initial value setting section 23 in apparatus 11 performs initial value setting to ascertain a mutual relative distance, positions, and orientations (S32). Relative distance at this time is measured by distance calculation section 24 using a distance measurement system utilizing a radio signal, as disclosed in Japanese Patent Registration No. 3649404, for example.

At this time, provision is made for distance calculation section 24 to calculate the distance from other apparatus 12 only when radio transmitting/receiving section 13 receives a radio signal from other apparatus 12. By this means, unnecessary computational processing is eliminated, and power saving is achieved.

In both apparatus 11 and other apparatus 12, initial data is extracted from a gyro or the like installed in each, and their mutual position and orientation initial values are set.

Next, apparatus 11 detects a displacement amount of the apparatus by means of local apparatus displacement amount detection section 14 based on the set initial values, and, for example, calculates XY-axis and ZX-axis displacement amounts (S33, S34). Then apparatus 11 stores XY-axis displacement amount ($\theta$x1) data and ZX-axis displacement amount ($\theta$z1) data in local apparatus displacement amount holding section 18 (S35, S36).

If there is no XY-axis or ZX-axis displacement amount in steps S33 and S34, apparatus 11 proceeds to next steps S37 and S38.

Next, apparatus 11 extracts an other apparatus 12 displacement amount from a received signal by means of other apparatus displacement amount extraction section 15 (S37, S38), and calculates XY-axis and ZX-axis displacement amounts (S39, S40). Then apparatus 11 stores XY-axis displacement amount ($\theta$x2) data and ZX-axis displacement amount ($\theta$z2) data in other apparatus displacement amount holding section 19 (S41, S42).

If there is no XY-axis or ZX-axis displacement amount in steps S39 and S40, apparatus 11 proceeds to next step S43.

Apparatus 11 performs tracking control computation by means of direction calculation section 16 based on the above held data, and obtains correction values $\theta$x and $\theta$z (S43).

Based on these computation results, radio signal directivity direction control is performed by direction control section 17 (S44), and antenna directivity is adjusted to a predetermined direction by transmission/reception of actual radio signals by radio transmitting/receiving section 13 with that controlled orientation (S45).

An actual example of displacement amount correction by means of the above tracking control computation is shown below.

Figure 4:
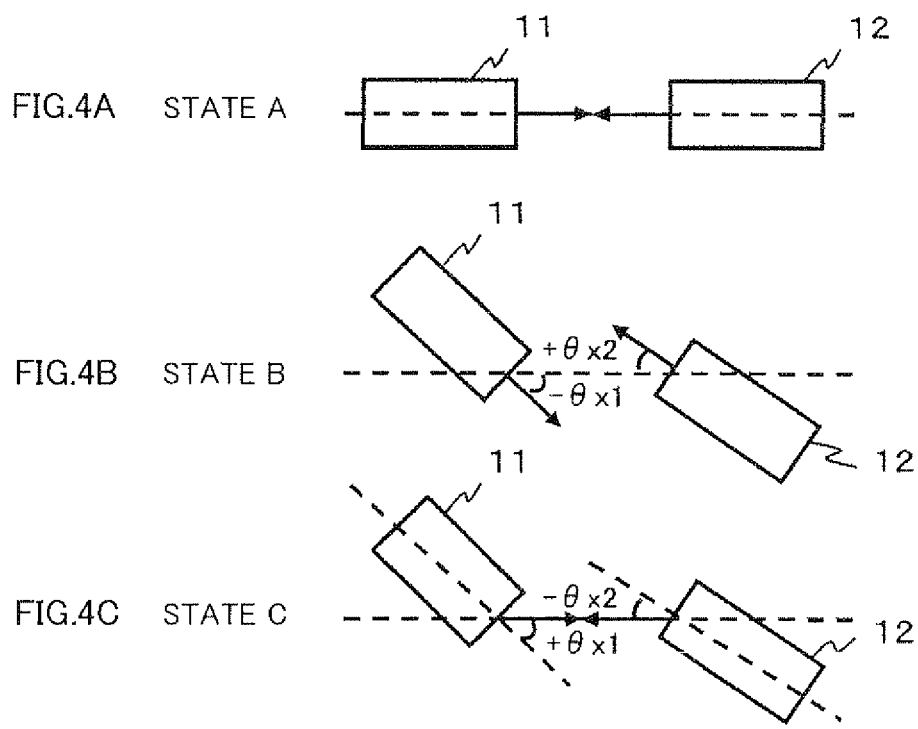
FIG. 4 is a drawing for explaining an actual example of the operation of Embodiment 1.

FIG. 4A through FIG. 4C are drawings for explaining an example of an XY-axis displacement amount. State A shown in FIG. 4A is an initial state in which apparatus 11 and other apparatus 12 are both aligned, and there is no displacement amount. State B shown in FIG. 4B is a state when time has elapsed since state A, and state C shown in FIG. 4C is a state when directivity direction control is performed with respect to state B.

Assume that the state of apparatus 11 and other apparatus 12 then changes from state A to state B, as shown in FIG. 4B, and apparatus 11 and other apparatus 12 move in directions $-\theta$x1 and $+\theta$x2 respectively with respect to the reference position. In this case, apparatus 11 and other apparatus 12 perform +θx1 and −θx2 corrections respectively in directions opposite to the directions in which they moved, as shown in state C in FIG. 4C.

By also performing the same kind of correction for the ZX-axis, the transmission/reception directivities of apparatus 11 and other apparatus 12 can be aligned.

Through the above procedure, when the position does not change and only the direction of radio transmitting/receiving section 13 changes for both apparatus 11 and other apparatus 12, radio signal emission directions of their mutual radio transmitting/receiving section 13 are changed by their respective amounts of movement. By this means, apparatus 11 and other apparatus 12 can perform communication in which the counterpart apparatus is tracked.

Figure 5:
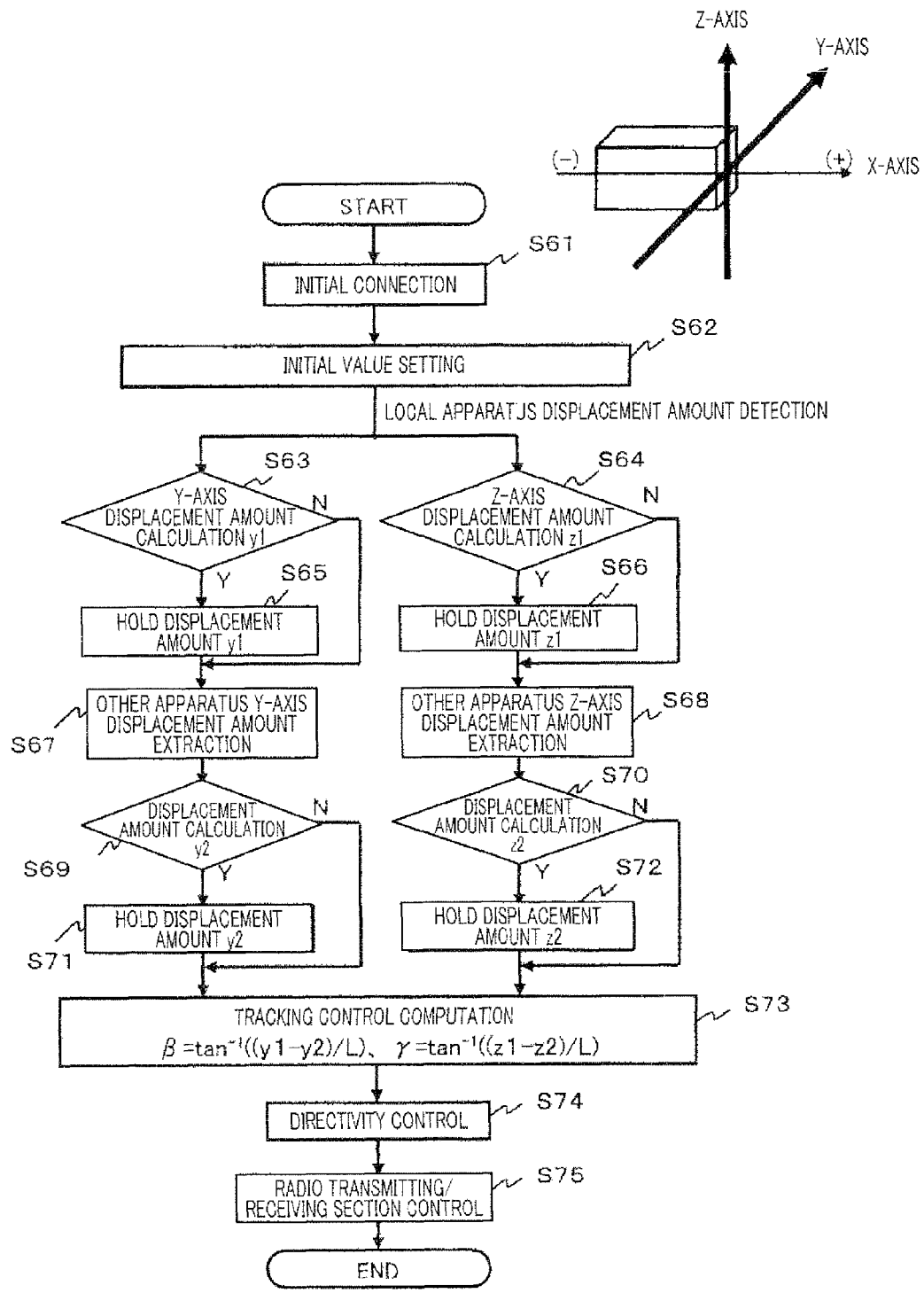
FIG. 5 is a second flowchart showing the operation of Embodiment 1.

FIG. 5 is a second flowchart showing the operation of this embodiment. The operation when the direction does not change and the position changes in the Y-Z-axis direction (vertical direction) for both apparatus 11 and other apparatus 12 is described here with reference to FIG. 1.

In FIG. 5, after initial mutual connection is first completed (S61), and a state in which data transmission/reception is possible is established, initial value setting section 23 performs initial value setting to ascertain a mutual relative distance, positions, and orientations (S62), in the same way as described in FIG. 3.

Apparatus 11 detects a displacement amount of apparatus 11 by means of local apparatus displacement amount detection section 14 based on the set initial values, and calculates displacement amounts from the reference position for the Y-axis and Z-axis (S63, S64). Then apparatus 11 holds Y-axis displacement amount (y1) data and Z-axis displacement amount (z1) data in local apparatus displacement amount holding section 18 (S65, S66).

If there is no Y-axis or Z-axis displacement amount in steps S63 and S64, apparatus 11 proceeds to next steps S67 and S68.

Next, apparatus 11 extracts other apparatus 12 Y-axis and Z-axis displacement amounts by means of other apparatus displacement amount extraction section 15 from a radio signal received by radio transmitting/receiving section 13 (S67, S68), and calculates Y-axis and Z-axis displacement amounts (S69, S70). Then apparatus 11 holds Y-axis displacement amount (y2) data and Z-axis displacement amount (z2) data in other apparatus displacement amount holding section 19 (S71, S72).

If there is no Y-axis or Z-axis displacement amount in steps S69 and S70, apparatus 11 proceeds to next step S73.

Based on the above held data and relative distance L between apparatus 11 and other apparatus 12, apparatus 11 performs the tracking control computations expressed in equations 1 and 2 below by means of direction calculation section 16, and obtains direction correction values β and γ (S73).

$$\beta = \tan^{-1}((y1-y2)/L) \quad \text{(Equation 1)}$$

$$\gamma = \tan^{-1}((z1-z2)/L) \quad \text{(Equation 2)}$$

Apparatus 11 performs radio signal directivity direction control by means of direction control section 17 based on the computation results of equations 1 and 2 (S74), and performs transmission/reception of actual radio signals by means of radio transmitting/receiving section 13 with that controlled orientation. By this means, apparatus 11 adjusts antenna directivity to the direction of other apparatus 12 (S75).

That is to say, in the case shown in FIG. 5, apparatus 11 obtains other apparatus 12 Y-axis displacement amount (y2) data and Z-axis displacement amount (z2) data. Then, based on the obtained other apparatus 12 displacement amount data, and apparatus 11 displacement amounts Y-axis displacement amount (y1) data and Z-axis displacement amount (z1) data, apparatus 11 calculates displacement amount direction correction values β and γ by means of direction calculation section 16, and performs transmission/reception correction by displacement amount direction correction values β and γ by means of direction control section 17.

Figure 6:
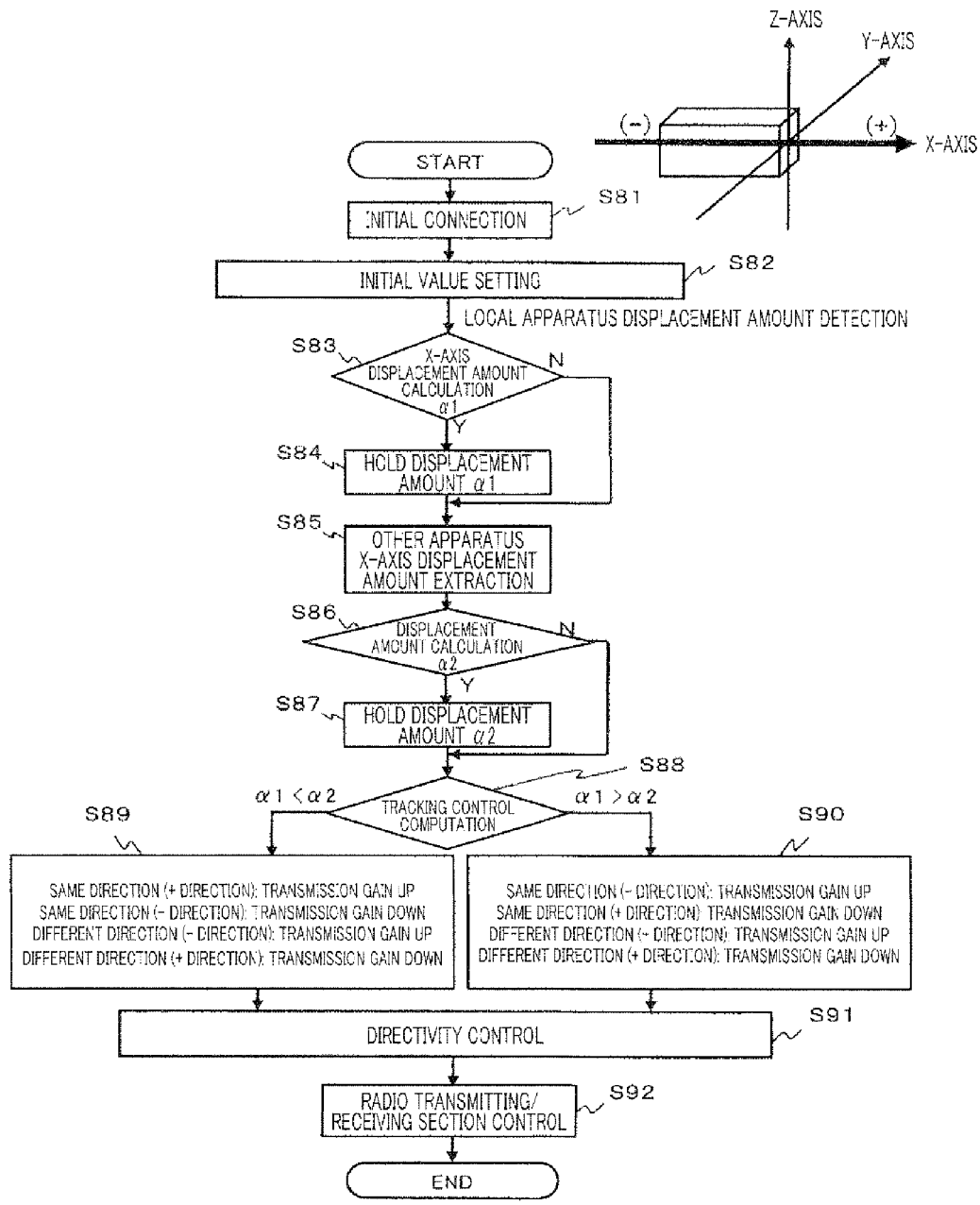
FIG. 6 is a third flowchart showing the operation of Embodiment 1.

FIG. 6 is a third flowchart showing the operation of this embodiment. The operation when the direction does not change and the position changes in the X-axis direction (horizontal direction) for both apparatus 11 and other apparatus 12 is described here with reference to FIG. 1.

In FIG. 6, after initial mutual connection between apparatus 11 and other apparatus 12 is first completed (S81), and a state in which data transmission/reception is possible is established, apparatus 11 performs initial value setting by means of initial value setting section 23 to ascertain a mutual relative distance, positions, and orientations (S82).

Next, apparatus 11 detects a displacement amount of apparatus 11 by means of local apparatus displacement amount detection section 14, and calculates a displacement amount from the X-axis reference position (S83). Then apparatus 11 holds X-axis displacement amount (α1) data in local apparatus displacement amount holding section 18 (S84).

If there is no X-axis displacement amount in step S83, apparatus 11 proceeds to next step S85.

Next, apparatus 11 extracts an other apparatus 12 displacement amount by means of other apparatus displacement amount extraction section 15 from a radio signal received by radio transmitting/receiving section 13 (S85), and calculates X-axis displacement amount (α2) data (S86). Then apparatus 11 holds X-axis displacement amount (α2) data in other apparatus displacement amount holding section 19 (S87).

If there is no X-axis displacement amount in step S86, apparatus 11 proceeds to next step S88.

Based on the above held data, apparatus 11 performs tracking control computation based on the following conditions by means of direction calculation section 16 (S88), and controls the transmission gain of apparatus 11.

1. When α1<α2, and apparatus 11 and other apparatus 12 both move in the same direction on the X-axis (S89)

Apparatus 11 and other apparatus 12 move in the (−) direction: Transmission gain is decreased Apparatus 11 and other apparatus 12 move in the (+) direction: Transmission gain is increased 2. When α1<α2, and apparatus 11 and other apparatus 12 move in different directions on the X-axis (S89)

Apparatus 11 moves in the (−) direction and other apparatus 12 moves in the (+) direction: Transmission gain is increased Apparatus 11 moves in the (+) direction and other apparatus 12 moves in the (−) direction: Transmission gain is decreased 3. When α1>α2, and apparatus 11 and other apparatus 12 both move in the same direction on the X-axis (S90)

Apparatus 11 and other apparatus 12 move in the (−) direction: Transmission gain is increased Apparatus 11 and other apparatus 12 move in the (+) direction: Transmission gain is decreased 4. When α1>α2, and apparatus 11 and other apparatus 12 move in different directions on the X-axis (S90)

Apparatus 11 moves in the (−) direction and other apparatus 12 moves in the (+) direction: Transmission gain is increased Apparatus 14 moves in the (+) direction and other apparatus 12 moves in the (−) direction: Transmission gain is decreased Apparatus 11 performs radio signal directivity direction control by means of direction control section 17 based on these computation results (S91), and actually adjusts gain and sends a radio signal by means of radio transmitting/receiving section 13 (S92).

That is to say, in the case shown in FIG. 6, apparatus 11 obtains other apparatus 12 displacement amount X-axis displacement amount ($\alpha 2$), and based on this data and apparatus 11 displacement amount X-axis displacement amount ($\alpha 1$) data, calculates a direction of movement and movement amount by means of direction calculation section 16. Then apparatus 11 performs transmission gain correction by means of radio transmitting/receiving section 13 based on this calculation result.

In the above description, operation has been divided into the three operations shown in FIG. 3, FIG. 5, and FIG. 6, but apparatus 11 actually performs these three operations in parallel, and performs control that combines the calculation results of the respective operations. This is because it is assumed that movements of both apparatus 11 and other apparatus 12 combine directional movement, vertical-direction movement, and horizontal-direction movement. That is to say, apparatus 11 performs displacement amount detection divided into respective operations by means of local apparatus displacement amount detection section 14 and other apparatus displacement amount extraction section 15, calculates orientation and movement amount correction values for the respective operations by means of direction calculation section 16, and performs control combining these calculation results by means of direction control section 17 and radio transmitting/receiving section 13.

It goes without saying that the present invention can obtain the same effect if displacement amounts are acquired by using a different analysis method instead of division into such operations.

If apparatus 11 determines by means of arrival determination section 20 that other apparatus 12 has not received an apparatus 11 radio signal at the time of initial connection in step S31 in FIG. 3 (S46), apparatus 11 detects a received signal level at apparatus 11 by means of radio transmitting/receiving section 13 (S47). Then, based on the received signal level, apparatus 11 dynamically sets a reception direction and distance range accordingly by means of reception range control section 21 and reception distance control section 22 respectively (S48, S49).

Following this, apparatus 11 performs radio signal directivity direction control by means of direction control section 17 in accordance with the set direction (S44), and performs output (gain) control by means of output control section 27 based on the set distance (S50). Apparatus 11 controls an actual radio signal by means of radio transmitting/receiving section 13 in accordance with these controls (S45), and can achieve power saving and reduce situations in which reception cannot be performed by setting antenna directivity.

That is to say, if other apparatus 12 cannot be found despite transmission of a radio signal to search for other apparatus 12 from apparatus 11 at the time of initial connection, a radio signal indicating reception of an apparatus 11 radio signal is not transmitted from other apparatus 12.

Therefore, first, if apparatus 11 determines by means of arrival determination section 20 that other apparatus 12 has not received an apparatus 11 radio signal, apparatus 11 makes provision for apparatus 11 displacement amount information detected by local apparatus displacement amount detection section 14 not to be included in a radio signal to other apparatus 12 by radio transmitting/receiving section 13. By this means, radio transmitting/receiving section 13 power saving can be achieved.

Next, if apparatus 11 similarly determines by means of arrival determination section 20 that other apparatus 12 has not received an apparatus 11 radio signal, apparatus 11 sets a wider angular range for reception by means of reception range control section 21 than when a radio signal has been received. By this means, other apparatus 12 can be made easy to find by increasing the range in which other apparatus 12 is searched for.

Conversely, if apparatus 11 determines by means of arrival determination section 20 that other apparatus 12 has received an apparatus 11 radio signal, apparatus 11 sets a narrower angular range for reception by means of reception range control section 21 than when a radio signal has not been received. By this means, other apparatus 12 can be made easy to identify.

Furthermore, if apparatus 11 determines by means of arrival determination section 20 that other apparatus 12 has not received an apparatus 11 radio signal, apparatus 11 sets a longer distance for reception by means of reception distance control section 22 than when a radio signal has been received. By this means, other apparatus 12 that is distant can be made easy to find.

A radio signal is also not transmitted from other apparatus 12 if apparatus 11 finds other apparatus 12 but that other apparatus 12 cannot find apparatus 11. In this case, also, apparatus 11 determines by means of arrival determination section 20 that other apparatus 12 has not received an apparatus 11 radio signal.

In this case, based on an arrival determination section 20 determination result, apparatus 11 can deliver an apparatus 11 radio signal to other apparatus 12 by transmitting after changing the direction in which the radio signal is transmitted to a different direction from the original transmission direction by means of direction control section 17. By this means, establishing a connection with other apparatus 12 becomes easy.

In the case of a portable information terminal of the kind in this embodiment, power saving is generally particularly required for the sake of mobility.

Thus, in this embodiment, in FIG. 3 apparatus 11 calculates a relative distance between apparatus 11 and other apparatus 12 by means of distance calculation section 24 based on a radio signal from other apparatus 12 received by radio transmitting/receiving section 13, and holds that relative distance (S51). Then apparatus 11 determines whether or not the relative distance is a predetermined distance beyond the reach of a radio signal (S52), and if the relative distance is greater than or equal to the predetermined distance, controls output by means of output control section 27 so as to lower the output of a radio signal transmitted from radio transmitting/receiving section 13 (S50). Therefore, wasteful transmission of a radio signal when other apparatus 12 is located at a distance beyond the reach of a radio signal, for instance, can be reduced, and power saving can be achieved.

Similarly, in this embodiment, apparatus 11 predicts a future distance from other apparatus 12 by means of distance prediction section 25 based on an other apparatus 12 displacement amount acquired by other apparatus displacement amount extraction section 15. Then, if that predicted distance is greater than or equal to a predetermined threshold value, apparatus 11 controls output by means of output control section 27 so as to lower the output of a radio signal transmitted from radio transmitting/receiving section 13. Therefore, wasteful transmission of a radio signal when other apparatus 12 is predicted to move much farther away, for instance, can be reduced, and power saving can be achieved.

Furthermore, in this embodiment, apparatus 11 also controls output by means of output control section 27 so as to lower the output of a radio signal transmitted from radio transmitting/receiving section 13 if apparatus 11 determines by means of arrival determination section 20 that other apparatus 12 has not received an apparatus 11 radio signal. Therefore, wasteful transmission of a radio signal when other apparatus 12 cannot be found at the time of initial connection can be reduced, and power saving can be achieved.

Not only for portable information terminals, but also for radio communication apparatuses in general, there is a requirement for radio signals to be transmitted and received over as great a distance as possible in addition to a requirement for power saving.

Thus, in this embodiment, as described above, in FIG. 3 apparatus 11 calculates a relative distance between apparatus 11 and other apparatus 12 by means of distance calculation section 24 based on a radio signal from other apparatus 12 transmitted/received by radio transmitting/receiving section 13 (S51). Then apparatus 11 determines whether or not the relative distance is a predetermined distance beyond the reach of a radio signal (S52), and if the relative distance is greater than or equal to the predetermined distance, controls output communication quality by means of communication quality control section 26 so as to lower the communication quality of a radio signal transmitted from radio transmitting/receiving section 13 (S53).

By this means, apparatus 11 can transmit a radio signal with lower communication quality when other apparatus 12 is distant, for instance, and can increase error robustness accordingly, enabling a radio signal to be transmitted even to other apparatus 12 that is distant.

Similarly, in this embodiment, apparatus 11 controls output communication quality by means of communication quality control section 26 so as to lower the communication quality of a radio signal transmitted from radio transmitting/receiving section 13 if a future distance between apparatus 11 and other apparatus 12 predicted by distance prediction section 25 is greater than or equal to a predetermined threshold value. Therefore, apparatus 11 can transmit a radio signal with lower communication quality when other apparatus 12 is predicted to move far away, for instance, and can increase error robustness accordingly, enabling a radio signal to be transmitted even to other apparatus 12 moving far away.

Furthermore, in this embodiment, apparatus 11 also controls output communication quality by means of communication quality control section 26 so as to lower the communication quality of a radio signal transmitted from radio transmitting/receiving section 13 if apparatus 11 determines by means of arrival determination section 20 that other apparatus 12 has not received an apparatus 11 radio signal. Therefore, apparatus 11 can transmit a radio signal with lower communication quality when other apparatus 12 cannot be found at the time of initial connection, and can increase error robustness accordingly, enabling a radio signal to be transmitted even to other apparatus 12 that is distant.

When apparatus 11 controls output by means of communication quality control section 26 so as to lower output communication quality in this way, it is desirable for apparatus 11 to include a communication quality information indicating that the communication quality has been changed in a radio signal output from radio transmitting/receiving section 13. By this means, decoding of a radio signal by other apparatus 12 receiving that radio signal becomes easy.

In this embodiment it is assumed that, in lowering communication quality as described above, communication quality control section 26 of apparatus 11 constantly monitors a received signal strength indicator (RSSI) or bit error rate (BER), and reduces the radio signal transmission rate if the communication quality degrades, for instance.

By this means, even if close to the limits of radio transmitting/receiving section 13 directivity tracking, apparatus 11 can lower the communication quality, as described above, and increase error robustness accordingly, enabling communication to be performed with other apparatus 12 that is distant, and a communication state to be maintained.

As described above, according to this embodiment, apparatus 11 exchanges displacement amounts of apparatus 11 and other apparatus 12, and performs change control of the direction of apparatus 11 signal emission from radio transmitting/receiving section 13 with respect to other apparatus 12 based on both displacement amounts. By this means, apparatus 11 and other apparatus 12 can perform communication in which the counterpart apparatus is constantly tracked, with no interruption of communication, even if both apparatuses move.

Embodiment 2

FIG. 7A and FIG. 7B are configuration diagrams showing a radio transmitting/receiving section according to Embodiment 2 of a radio communication control apparatus of the present invention.

In this embodiment it is assumed that radio transmitting/receiving section 13 of the radio communication control apparatus shown in FIG. 1 is an array antenna (for example, a phased array antenna), while the rest of the configuration is the same as in FIG. 1.

In FIG. 7A, a radio transmitting/receiving section of this embodiment has a configuration in which array antenna 44 is arrayed two-dimensionally, for example. Array antenna 44 is equipped with, for example, a plurality of element antennas 40, amplifier circuits 41 and phase shifters 42 for performing directivity control for radio signals in branches equivalent to the number of these element antennas 40, and distribution circuit 43 that distributes signals to element antennas 40.

Therefore, in this embodiment, the radio transmitting/receiving section can change the emission direction of a radio signal by changing the amplitude or phase, or both, of a radio signal by means of amplifier circuits 41 and phase shifters 42 based on a direction calculated by direction calculation section 16 in FIG. 1. If a phased array antenna is used, the radio transmitting/receiving section can change the emission direction of a radio signal by changing the phase, or the phase and amplitude, of a radio signal.

In FIG. 7B, a radio transmitting/receiving section of this embodiment comprises, for example, array antenna 44 on which a plurality of patch antennas 45 are arrayed on a two-dimensional planar surface. By means of this configuration, the radio transmitting/receiving section can emit radio signals in arbitrary XY-axis and ZX-axis directions.

Therefore, in this embodiment, apparatus 11 can perform change control of the emission direction of a radio signal emitted from array antenna 44 of this kind based on a direction calculated by direction calculation section 16 in FIG. 1.

That is to say, in this embodiment, apparatus 11 can constantly track the emission direction of a radio signal to the counterpart apparatus, with no interruption of communication, even if apparatus 11 and other apparatus 12 both move.

Furthermore, in this embodiment, radio transmitting/receiving section 13 is not moved mechanically, enabling the apparatus to be made smaller than that of Embodiment 1 shown in FIG. 1.

In the embodiments thus far, cases have been described in which apparatus 11 and other apparatus 12 are mobile devices such as portable information terminals, but a radio communication control apparatus of the present invention is not limited to this, and is also effective if installed in a mobile object such as a vehicle.

That is to say, by installing radio communication control apparatuses of the present invention in vehicles capable of high-speed movement such as automobiles, uninterrupted vehicle-to-vehicle communication can be performed by tracking a counterpart automobile irrespective of what positions the vehicles move to.

Moreover, since microwave communication can be performed, vehicle-to-vehicle provision of sophisticated information and services is possible.

As described above, according to a radio communication control apparatus of the present invention, a direction calculation section calculates a direction of transmission and reception by a radio transmitting/receiving section based on a displacement amount of the apparatus body and a displacement amount of another apparatus acquired by a local apparatus displacement amount detection section and an other apparatus displacement amount extraction section respectively, and a direction control section controls the transmission/reception direction of the radio transmitting/receiving section based on that calculated direction. By this means, a radio communication control apparatus of the present invention can perform tracking to optimally maintain the orientation of the radio transmitting/receiving section in the direction of the other apparatus at all times, and perform stable communication with the other apparatus without interruption, even when both apparatuses are portable information terminals or the like that move relative to each other, and even if the position and direction of the other apparatus become outside the range of directivity of the radio transmitting/receiving section of the apparatus body.

A radio communication control apparatus of the present invention has a configuration comprising: a radio transmitting/receiving section that transmits and receives radio signals; a local apparatus displacement amount detection section that detects a displacement amount of the apparatus body; an other apparatus displacement amount extraction section that extracts from a radio signal received by the radio transmitting/receiving section a displacement amount of another apparatus that is the transmission source of that radio signal; a direction calculation section that calculates a direction in which a radio signal is transmitted/received based on a displacement amount of the apparatus body and a displacement amount of the other apparatus; and a direction control section that controls the transmission/reception direction of the radio transmitting/receiving section based on the calculated direction.

By this means, the transmission/reception direction of the radio transmitting/receiving section of the local device is controlled based on displacement amounts of the apparatus body and another apparatus, enabling optimal antenna orientation to be maintained at all times, and stable communication to be performed by tracking the counterpart apparatus without interruption.

A radio communication control apparatus of the present invention has a configuration further comprising a distance calculation section that calculates the distance of the apparatus body from another apparatus based on a radio signal received by the radio transmitting/receiving section.

By this means, a direction in which radio signals are transmitted and received can be calculated based on the distance between the apparatus body and another apparatus.

A radio communication control apparatus of the present invention has a configuration whereby the distance calculation section calculates the distance of the apparatus body from another apparatus only when the radio transmitting/receiving section receives a radio signal.

By this means, the distance between the apparatus body and another apparatus is not calculated unnecessarily, and power saving is achieved.

A radio communication control apparatus of the present invention has a configuration whereby displacement amount information indicating a displacement amount of the apparatus body is not included in a radio signal transmitted by the radio transmitting/receiving section if the radio transmitting/receiving section does not receive a radio signal.

By this means, wasteful transmission of displacement amount information is not performed when another apparatus cannot be found at the time of initial connection, enabling power saving to be achieved.

A radio communication control apparatus of the present invention has a configuration comprising: a reception range control section that controls a range in which the radio transmitting/receiving section receives a radio signal; and an arrival determination section that determines from a radio signal received by the radio transmitting/receiving section whether or not another apparatus has received a radio signal transmitted by the radio transmitting/receiving section; wherein, if the arrival determination section determines that the other apparatus has not received a radio signal, the reception range control section makes the range for reception wider than when a radio signal is determined to have been received.

By this means, if another apparatus is not found at the time of initial connection, the reception range control section widens the range for receiving a radio signal, enabling another apparatus to be searched for in a wide range.

A radio communication control apparatus of the present invention has a configuration comprising: a reception range control section that controls a range in which the radio transmitting/receiving section receives a radio signal; and an arrival determination section that determines from a radio signal received by the radio transmitting/receiving section whether or not another apparatus has received a radio signal transmitted by the radio transmitting/receiving section; wherein, if the arrival determination section determines that the other apparatus has received a radio signal, the reception range control section makes the range for reception narrower than when a radio signal is determined to have not been received.

By this means, if another apparatus is found at the time of initial connection, the reception range control section narrows the range for receiving a radio signal, enabling another apparatus to be identified.

A radio communication control apparatus of the present invention has a configuration comprising: a reception distance control section that controls a distance over which the radio transmitting/receiving section receives a radio signal; and an arrival determination section that determines from a radio signal received by the radio transmitting/receiving section whether or not another apparatus has received a radio signal transmitted by the radio transmitting/receiving section; wherein, if the arrival determination section determines that the other apparatus has not received a radio signal, the reception distance control section makes the distance for reception longer than when a radio signal is determined to have been received.

By this means, if another apparatus is not found at the time of initial connection, the reception distance control section increases the distance for receiving a radio signal, enabling another apparatus that is distant to be searched for.

A radio communication control apparatus of the present invention has a configuration comprising: a transmission direction control section that changes a direction in which the radio transmitting/receiving section transmits a radio signal; and an arrival determination section that determines from a radio signal received by the radio transmitting/receiving section whether or not another apparatus has received a radio signal transmitted by the radio transmitting/receiving section; wherein, if the arrival determination section determines that the other apparatus has not received a radio signal, the transmission direction is changed.

By this means, if another apparatus does not find the local apparatus body at the time of initial connection, the radio signal transmission direction is changed, enabling a radio signal to reach the other apparatus.

A radio communication control apparatus of the present invention has a configuration comprising an output control section that controls output of a radio signal transmitted by the radio transmitting/receiving section.

By this means, power saving is achieved by controlling radio signal output according to the conditions.

A radio communication control apparatus of the present invention has a configuration further comprising a distance calculation section that calculates the distance of the apparatus body from another apparatus, wherein the output control section changes radio signal output according to the distance calculated by the distance calculation section.

By this means, power saving is achieved by reducing radio signal output when the distance from another apparatus is greater than or equal to a certain distance.

A radio communication control apparatus of the present invention has a configuration further comprising a distance prediction section that predicts a future distance of the apparatus body from another apparatus, wherein the output control section changes radio signal output according to the distance predicted by the distance prediction section.

By this means, power saving is achieved by reducing radio signal output when the distance from another apparatus is predicted to be greater than or equal to a certain distance.

A radio communication control apparatus of the present invention has a configuration comprising an arrival determination section that determines from a radio signal received by the radio transmitting/receiving section whether or not another apparatus has received a radio signal transmitted by the radio transmitting/receiving section; wherein, if the arrival determination section determines that the other apparatus has not received a radio signal, the output control section changes radio signal output compared with a case in which a radio signal is determined to have been received.

By this means, power saving is achieved by reducing radio signal output when another apparatus is not found at the time of initial connection.

A radio communication control apparatus of the present invention has a configuration further comprising a communication quality control section that controls the communication quality of a radio signal transmitted by the radio transmitting/receiving section.

By this means, communication can be performed with another apparatus that is distant by controlling radio signal communication quality according to the conditions.

A radio communication control apparatus of the present invention has a configuration further comprising a distance calculation section that calculates the distance of the apparatus body from another apparatus, wherein the communication quality control section controls the communication quality of a transmitted radio signal according to the distance calculated by the distance calculation section.

By this means, the communication quality of a transmitted radio signal is lowered according to the distance from another apparatus, and communication can be performed with another apparatus that is distant.

A radio communication control apparatus of the present invention has a configuration further comprising a distance prediction section that predicts a future distance of the apparatus body from another apparatus, wherein the communication quality control section controls the communication quality of a transmitted radio signal according to the distance predicted by the distance prediction section.

By this means, the communication quality of a transmitted radio signal is lowered according to the distance from another apparatus predicted by the distance prediction section, and communication can be performed with another apparatus that is distant.

A radio communication control apparatus of the present invention has a configuration comprising an arrival determination section that determines from a radio signal received by the radio transmitting/receiving section whether or not another apparatus has received a radio signal transmitted by the radio transmitting/receiving section; wherein, if the arrival determination section determines that the other apparatus has not received a radio signal, the communication quality control section controls the communication quality of a transmitted radio signal.

By this means, the communication quality of a radio signal transmitted at the time of initial connection is lowered, and communication can be performed with another apparatus that is distant.

A radio communication control apparatus of the present invention has a configuration whereby, when the communication quality control section controls radio signal communication quality, the communication quality control section includes communication quality information indicating a change of communication quality in a transmitted radio signal.

By this means, when radio signal communication quality is controlled, radio signal reception by another apparatus can be made easy by including communication quality information indicating a change of communication quality.

The disclosure of Japanese Patent Application No. 2007-292839, filed on Nov. 12, 2007, including the specification, drawings and abstract, is incorporated herein by reference in its entirety.

INDUSTRIAL APPLICABILITY

The present invention enables tracking to be performed to optimally maintain the orientation of a radio transmitting/receiving section in the direction of another apparatus at all times, and perform stable communication with the other apparatus without interruption, even when both apparatuses are terminals or the like that move relative to each other, and is therefore suitable for use in a portable information terminal, in-vehicle terminal, or the like.

The invention claimed is:

1. A radio communication control apparatus comprising:
a radio transmitting/receiving section that transmits and receives radio signals;

an initial value setting section that captures a mutual synchronization signal at a time of connection with another apparatus, and sets initial values of a position and direction of an apparatus body with respect to the other apparatus and initial values of a position and direction of the other apparatus with respect to the apparatus body;

a local apparatus displacement amount detection section that detects a displacement amount of the apparatus body with respect to the initial values of the apparatus body;

another apparatus displacement amount extraction section that extracts, from a radio signal from the other apparatus received by the radio transmitting/receiving section, a displacement amount of the other apparatus with respect to the initial values of the other apparatus;

a direction calculation section that calculates a direction in which the radio signal is transmitted/received based on the displacement amount of the apparatus body and the displacement amount of the other apparatus; and a direction control section that controls transmission/reception direction of the radio transmitting/receiving section based on the calculated direction.

2. The radio communication control apparatus according to claim 1, further comprising a distance calculation section that calculates a distance of the apparatus body from the other apparatus based on a radio signal received by the radio transmitting/receiving section.

3. The radio communication control apparatus according to claim 2, wherein the distance calculation section calculates a distance of the apparatus body from the other apparatus only when the radio transmitting/receiving section receives a radio signal.

4. The radio communication control apparatus according to claim 1, wherein displacement amount formation indicating the displacement amount of the apparatus body is not included in a radio signal transmitted by the radio transmitting/receiving section if the radio transmitting/receiving section does not receive a radio signal.

5. The radio communication control apparatus according to claim 1, further comprising:

a reception range control section that controls a range in which the radio transmitting/receiving section receives a radio signal; and an arrival determination section that determines from a radio signal received by the radio transmitting/receiving section whether or not the other apparatus has received a radio signal transmitted by the radio transmitting/receiving section, wherein, if the arrival determination section determines that the other apparatus has not received a radio signal, the reception range control section makes a range for reception wider than when the radio signal is determined to have been received.

6. The radio communication control apparatus according to claim 1, further comprising:

a reception range control section that controls a range in which the radio transmitting/receiving section receives a radio signal; and an arrival determination section that determines from a radio signal received by the radio transmitting/receiving section whether or not the other apparatus has received a radio signal transmitted by the radio transmitting/receiving section, wherein, if the arrival determination section determines that the other apparatus has received a radio signal, the reception range control section makes a range for reception narrower than when the radio signal is determined to have not been received.

7. The radio communication control apparatus according to claim 1 further comprising:

a reception distance control section that controls a distance over which the radio transmitting/receiving section receives a radio signal; and an arrival determination section that determines from a radio signal received by the radio transmitting/receiving section whether or not the other apparatus has received a radio signal transmitted by the radio transmitting/receiving section, wherein, if the arrival determination section determines that the other apparatus has not received a radio signal, the reception distance control section makes the distance for reception longer than when the radio signal is determined to have been received.

8. The radio communication control apparatus according to claim 1, further comprising:

a transmission direction control section that changes a direction in which the radio transmitting/receiving section transmits a radio signal; and an arrival determination section that determines from a radio signal received by the radio transmitting/receiving section whether or not the other apparatus has received a radio signal transmitted by the radio transmitting/receiving section, wherein, if the arrival determination section determines that the other apparatus has not received a radio signal, the transmission direction control section changes the transmission direction.

9. The radio communication control apparatus according to claim 1, further comprising an output control section that controls output of a radio signal transmitted by the radio transmitting/receiving section.

10. The radio communication control apparatus according to claim 9, further comprising a distance calculation section that calculates a distance of the apparatus body from the other apparatus, wherein the output control section changes output of the radio signal according to the distance calculated by the distance calculation section.

11. The radio communication control apparatus according to claim 9, further comprising a distance prediction section that predicts a future distance of the apparatus body from the other apparatus, wherein the output control section changes output of the radio signal according to the distance predicted by the distance prediction section.

12. The radio communication control apparatus according to claim 9, further comprising an arrival determination section that determines from a radio signal received by the radio transmitting/receiving section whether or not the other apparatus has received a radio signal transmitted by the radio transmitting/receiving section, wherein, if the arrival determination section determines that the other apparatus has not received a radio signal, the output control section changes output of the radio signal compared with a case in which the radio signal is determined to have been received.

13. The radio communication control apparatus according to claim 1, further comprising a communication quality control section that controls communication quality of a radio signal transmitted by the radio transmitting/receiving section.

14. The radio communication control apparatus according to claim 13, further comprising a distance calculation section that calculates a distance of the apparatus body from the other apparatus, wherein the communication quality control section controls communication quality of the transmitted radio signal according to the distance calculated by the distance calculation section.

15. The radio communication control apparatus according to claim 13, further comprising a distance prediction section that predicts a future distance of the apparatus body from the other apparatus, wherein the communication quality control section controls communication quality of the transmitted radio signal according to the distance predicted by the distance prediction section.

16. The radio communication control apparatus according to claim 13, further comprising an arrival determination section that determines from a radio signal received by the radio transmitting/receiving section whether or not the other apparatus has received a radio signal transmitted by the radio transmitting/receiving section, wherein, if the arrival determination section determines that the other apparatus has not received a radio signal, the communication quality control section controls communication quality of the transmitted radio signal.

17. The radio communication control apparatus according to claim 13, wherein, when the communication quality control section controls communication quality of the transmitted radio signal, the communication quality control section includes communication quality information indicating a change of communication quality in the transmitted radio signal.

18. The radio communication control apparatus according to claim 1, wherein the displacement amount of the apparatus body includes a rotation angle of the apparatus body.

19. A radio communication control apparatus comprising:
a radio transmitting/receiving section that transmits and receives radio signals;
an initial value setting section that captures a mutual synchronization signal at a time of connection with another apparatus, and sets initial values of a position and direction of an apparatus body with respect to the other apparatus and initial values of a position and direction of the other apparatus with respect to the apparatus body;
a local apparatus displacement amount detection section that detects a displacement amount of the apparatus body with respect to the initial values of the apparatus body, including a rotation angle of the apparatus body;
another apparatus displacement amount extraction section that extracts, from a radio signal from the other apparatus received by the radio transmitting/receiving section, a displacement amount of the other apparatus with respect to the initial values of the other apparatus;
a direction calculation section that calculates a direction in which the radio signal is transmitted/received based on the displacement amount of the apparatus body and the displacement amount of the other apparatus; and
a direction control section that controls a transmission/reception direction of the radio transmitting/receiving section based on the calculated direction.

\* \* \* \* \*